UNITED STATES PATENT OFFICE.

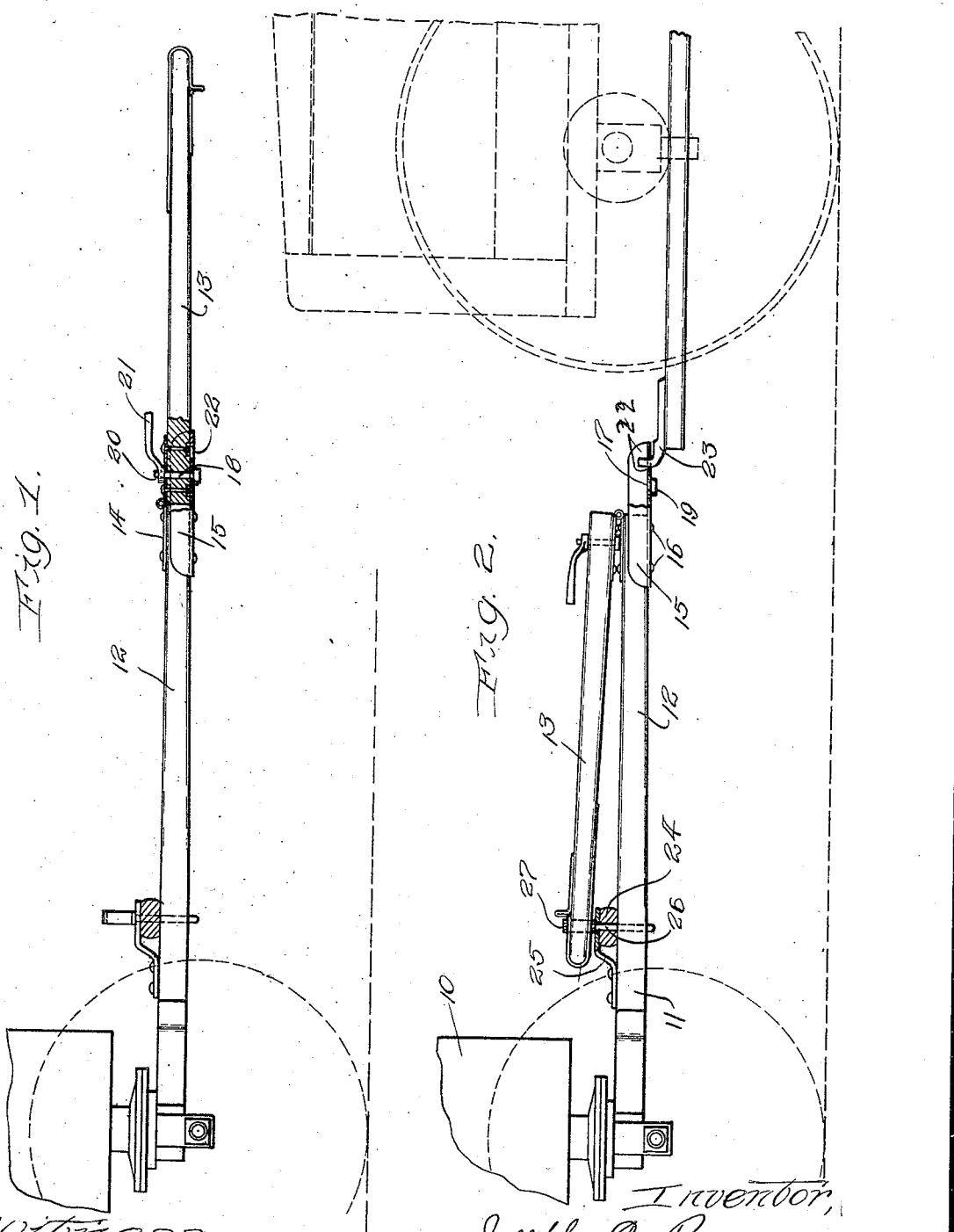

JOSEPH C. REUSE, OF LIBERTYVILLE, ILLINOIS.

TRACTION COUPLING.

1,422,129.   Specification of Letters Patent.   Patented July 11, 1922.

Application filed March 16, 1921. Serial No. 452,664.

*To all whom it may concern:*

Be it known that I, JOSEPH C. REUSE, a citizen of the United States, residing at Libertyville, in the county of Lake and State of Illinois, have invented certain new and useful Improvements in Traction Couplings, of which the following is a specification.

This invention relates to mechanism for attaching vehicles, or other conveyances, to a traction device, such as a farm tractor, or to one another in a train, in which the connecting mechanism is so arranged that horses may be substituted for the tractor in transferring said vehicles singly. The invention has for its object the provision of a mechanism of the class named which shall be of improved construction and operation and it is exemplified in the combination and arrangement of parts shown in the accompanying drawing and described in the following specification, the invention being more particularly pointed out in the appended claim.

In the drawing—

Fig. 1 is an elevation of one form of the invention with the parts in section; and Fig. 2 is an elevation similar to Fig. 1 but showing the coupling mechanism in position for attachment to a tractor or to another vehicle in a train.

In the use of wagons, trucks and other conveyances, and especially in their use in farm work, it is desirable that the conveyance may be so arranged that it may be conveniently drawn by a number of different agencies. The wagons are sometimes secured to one another in a train and the entire train attached to a tractor or other motor propelling agency, and at other times it is desirable that the vehicle may be drawn by a team of horses. Where animals are used they are commonly hitched to a wagon in pairs with a pole or tongue between the two animals so that the wagon may be readily guided. If a wagon provided with such a tongue is drawn by a tractor, the tongue will ordinarily interfere with a close coupling between the tractor and the wagon which makes it inconvenient for guiding the wagon, and especially is this true where a series of such vehicles are connected in a train. In the present invention a wagon or other vehicle is represented at 10 having a pole or tongue 11 secured to the front axle thereof in the usual manner. The tongue 11 is separated about midway thereof into a rear section 12 and a front section 13. A hinge 14 is attached to the top of the tongue and connects the two sections to one another so that the front section may be swung about the pivot of the hinge into a folded position, as shown in Fig. 2. A sheet metal channel 15 is attached to the front end of the rear section by rivets or bolts 16 and provides a stop for limiting the downward movement of the front section when the tongue is extended. The front portion of the channel 15 is provided with an opening 17 through which a bolt 18 extends, the head of the bolt being seated in a recess 19 formed by a downwardly extending rim on the channel member 15. The bolt 18 extends upwardly through the tongue 13 and is provided with a nut 20 having a handle 21 connected thereto by which the nut may be tightened upon the upper face of the tongue, thus firmly securing the front portion 13 in rigid position relative to the rear portion 12. When it is desired to fold the tongue backward it is only a matter of a few seconds to unscrew the nut 20 and remove the bolt 18 so that the section 13 may be readily folded. A second opening 22 is provided in the channel coupling 15 for receiving the coupling hook 23 or other attaching means by which the vehicle may be secured to a propelling device.

The usual double-tree 24 is provided having a strap 25 and pin 26 by which it is held in place. The pin 26 is provided at its upper end with a ring 27 for receiving the end of the tongue section 13. When the tongue is folded backward the ring is first slipped over the end of the tongue and then the pin 26 is inserted in place through the strap 25 and double-tree 24. This provides a secure fastening and support for the folded tongue section and prevents any wobbling or shaking of the section and holds it in a compact folded position entirely out of the way.

It will be readily seen that with the present invention a close hitch may be secured between the wagon and its propelling vehicle and yet the device may be adapted with minimum time and trouble for use with a team of animals.

I claim:

In combination, a vehicle having a forwardly extending pole comprising front and rear sections of approximately equal length, a hinge secured to the top of said pole for connecting adjacent ends of said sections, a channel member secured to the under side of said rear section adjacent the front end thereof and projecting beyond said section for receiving the rear end of said front section and for holding said sections in alignment with one another, a pin having a threaded end arranged to pass through the projecting portion of said channel member and the rear portion of said front section, a nut arranged to be threaded on to said pin for holding said channel member and front section in rigid relation to one another, said channel member having an opening therein for receiving a coupling device when said front section is folded, a double-tree for said vehicle, a pin for securing said double-tree to said pole adjacent the rear end of said rear section, and a ring carried by the upper end of said pin and arranged to receive the free end of said front section when said front section is folded backwardly along the upper face of said rear section.

In testimony whereof I have signed my name to this specification on this 8th day of March, A. D. 1921.

JOSEPH C. REUSE.